United States Patent
Järleholm et al.

(10) Patent No.: US 9,295,017 B2
(45) Date of Patent: Mar. 22, 2016

(54) METHODS AND ARRANGEMENT FOR SUPPORTING BASE STATION SYNCHRONIZATION BY USE OF LONG WAVE SIGNALING

(75) Inventors: Anders Wilhelm Järleholm, Sollentuna (SE); Tomas Georg Lagerqvist, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 211 days.

(21) Appl. No.: 13/985,892

(22) PCT Filed: Feb. 22, 2011

(86) PCT No.: PCT/SE2011/050197
§ 371 (c)(1), (2), (4) Date: Aug. 16, 2013

(87) PCT Pub. No.: WO2012/115546
PCT Pub. Date: Aug. 30, 2012

(65) Prior Publication Data
US 2013/0324173 A1 Dec. 5, 2013

(51) Int. Cl.
*H04W 56/00* (2009.01)

(52) U.S. Cl.
CPC ............ *H04W 56/001* (2013.01); *H04W 56/00* (2013.01); *H04W 56/006* (2013.01)

(58) Field of Classification Search
CPC .................. H04W 56/001; H04W 56/006
USPC ......... 455/502, 422.1, 67.16, 12.1, 3.02, 434, 455/67.11; 370/330, 347, 337
See application file for complete search history.

(56) References Cited

U.S. PATENT DOCUMENTS

| | | | |
|---|---|---|---|
| 6,272,118 B1 * | 8/2001 | Wewers et al. | 370/330 |
| 6,308,077 B1 * | 10/2001 | Walsh | 455/503 |
| 2004/0121806 A1 * | 6/2004 | Hashimoto | 455/67.11 |
| 2010/0034190 A1 | 2/2010 | Yun et al. | |

FOREIGN PATENT DOCUMENTS

WO 9408405 A1 9/1993

* cited by examiner

*Primary Examiner* — John J Lee
(74) *Attorney, Agent, or Firm* — Murphy, Bilak & Homiller, PLLC

(57) ABSTRACT

Methods and arrangements in a support node and in connection with a base station for supporting synchronization of the base station. The methods and arrangements involve conveying high-accuracy time information via long-wave signaling to the base station, which implies e.g. that base stations in unfavorable radio conditions may be synchronized without access to reliable IP connections or similar.

16 Claims, 7 Drawing Sheets

60 bits – 1 minute

METHODS AND ARRANGEMENT FOR SUPPORTING BASE STATION SYNCHRONIZATION BY USE OF LONG WAVE SIGNALING

TECHNICAL FIELD

The invention relates to methods and arrangements for supporting synchronization of base stations, especially base stations being located at sites having unfavorable radio conditions.

BACKGROUND

The requirements on exactness in regard of time and frequency for communicating over the air interface in communication systems using radio access technologies such as e.g. LTE (Long Term Evolution) or WCDMA (Wideband Code Division Multiple Access) are very high. For example, an LTE macro base station is required not to deviate in frequency from air interface-related frequencies more than 50 ppb (parts per billion), i.e. $50 \times 10^{-9}$ Hz, and not to deviate in time more than 1.5 μs for LTE-TDD (Time Division Duplex).

In order to fulfill these strict time and frequency requirements for communicating over the air interface, a base station normally relies on an external source to provide frequency and time synchronization.

For a base station with IP backhaul, frequency and time synchronization could be obtained from an external time server connected to the IP network, by use of protocols like IEEE 1588 or NTP (Network Time Protocol). Another solution is to use a GPS (Global Positioning System) receiver to achieve time and frequency synchronization.

However, the current solutions described above have several drawbacks, especially when deployed for smaller indoor base stations, such as e.g. pico base stations and/or home base stations i.e. so-called femto products. For example, GPS receivers do not function well in unfavorable radio conditions, such as indoor environments, since they require line of sight to a number of satellites. Further, synchronization by use of protocols such as NTP and IEEE 1588 implies that very strict requirements must be fulfilled by the backhaul link, in regard of e.g. packet loss and jitter. Typically, many IP connections, e.g. in home environments, do not fulfill such high requirements.

Thus, the synchronization of small base stations, such as e.g. pico base stations and home indoor base stations, having unfavorable radio conditions, is identified as a problem.

SUMMARY

It would be desirable to enable synchronization of base stations also in locations having unfavorable radio conditions and/or in premises having relatively low-quality IP-network connections. It is an object of the invention to enable synchronization of base stations also in locations having unfavorable radio conditions and/or in premises having relatively low-quality IP-network connections. Further, it is an object of the invention to provide a method and an arrangement for enabling synchronization of base stations in a simple and cost efficient manner associated with low computational complexity. These objects may be met by a method and arrangement according to the attached independent claims. Optional embodiments are defined by the dependent claims.

According to a first aspect, a method for supporting synchronization of a base station is provided in a support module. The method comprises obtaining high-accuracy time information from a reference source, and providing said high-accuracy time information to a base station by use of long wave signaling.

According to a second aspect, an arrangement is provided in a support module. The arrangement comprises a functional unit adapted to obtain high-accuracy time information from a reference source, and further comprises a functional unit adapted to provide said high-accuracy time information to a base station by use of long wave signaling.

According to a third aspect, a method for supporting synchronization of a base station is provided. The method comprises receiving a long wave signal from at least one support module, and deriving high-accuracy time and frequency information from the received signal(s). The method further comprises synchronizing the base station based on the derived information.

According to a fourth aspect, an arrangement connectable to a base station is provided. The arrangement comprises a functional unit adapted to receive long wave signals from at least one support module. The arrangement further comprises a functional unit adapted to derive high-accuracy time and frequency information from one or more received long wave signals. Further, the arrangement comprises a functional unit adapted to synchronize the base station, based on the derived information.

The above methods and arrangements may be implemented in different embodiments. In some embodiments the external source may be a satellite based positioning system, such as the Global Positioning System (GPS). Further, the support node may obtain its geographical position based on information obtained from the reference source, and provide said position to the base station by use of long wave signaling.

The synchronization of the base station may involve using the derived time information for synchronizing an internal clock of the base station. The synchronization could further involve deriving a high-accuracy frequency signal based on the derived high-accuracy time information, as reference frequency for synchronizing base station frequency generation, and/or deriving a carrier frequency of the long wave signaling, and synchronizing base station frequency generation, based on said derived carrier frequency.

The geographical position of the base station could be derived, based on the geographical position of at least one support module, when such information is provided by the support modules. When determined, the geographical position of the base station could be reported to a network control module.

Further, a propagation delay compensation factor may be calculated for the time information received from a first support module, based on the geographical position of said support module and the geographical position of the base station.

The above methods and arrangements may be used for provision of high-accuracy timing, frequency and position information to e.g. indoor base stations. High-accuracy timing, frequency and position information may be provided to base stations in locations having unfavorable radio conditions, and no demands are made on the quality of core or backhaul equipment. The above arrangements are of relatively low complexity, which enables fast introduction in communication systems. Further, a common set of support modules may be used by several operators, and the cost for the support modules may be shared between the operators. Base stations, such as e.g. home base stations, reporting their geographical position to the network may be beneficial to support network planning and billing.

The embodiments above have mainly been described in terms of a method. However, the description above is also intended to embrace embodiments of the arrangement, adapted to enable the performance of the above described features. The different features of the exemplary embodiments above may be combined in different ways according to need, requirements or preference.

BRIEF DESCRIPTION OF THE DRAWINGS

The invention will now be described in more detail by means of example embodiments and with reference to the accompanying drawings, in which.

DETAILED DESCRIPTION

Briefly described, the invention relates to the provision of synchronization information to base stations, especially to base stations in locations having unfavorable radio conditions and/or base stations having a backhaul link of insufficient quality. A support node or support module, which hereinafter may be referred to as a "Synchronization Repeater Module" (SRM), is introduced, which receives exact time information, and possibly frequency information, from a reference source, e.g. by use of a GPS receiver. The SRM can then e.g. broadcast absolute high-accuracy time information, and possibly information on the position of the SRM, in the long wave frequency band. The information could thus easily be obtained also by base stations in environments having unfavorable radio conditions, which base stations could use the information for synchronization purposes. A base station could use triangulation based on signals from a number of SRMs in order to achieve absolute time and/or the position of the base station.

The SRMs are to be distributed e.g. over or around an area in which base station synchronization is to be supported, for example, a city, a building, or a cluster of buildings. The distance between the SRMs is to be relatively short. For example, the distance between two neighboring SRMs could be selected e.g. in the range of 1-3 kilometers, depending e.g. on local topography.

Within this document, the term "high-accuracy information" is used as referring to information which at least fulfills the strict requirements on exactness for communicating over an air interface, related to radio access technologies such as e.g. LTE or WCDMA or similar. The term "long wave frequencies" is used as referring to frequencies which easily propagate through e.g. buildings and stone, as for example frequencies below 500 kHz, some of which even penetrate sea-water. Which exact frequency/ies that are to be used depends on which frequencies that are available or "free" in the respective country or region where the SRMs are located.

Further, the term "synchronizing" is used as referring to the action of providing high-accuracy time and frequency information to a base station in an adequate form, such that the base station may rely on the provided information e.g. to generate carrier frequencies and achieve exact timing precision, which fulfills the requirements for communicating over the air interface of the communication system in question.

Figure 1:
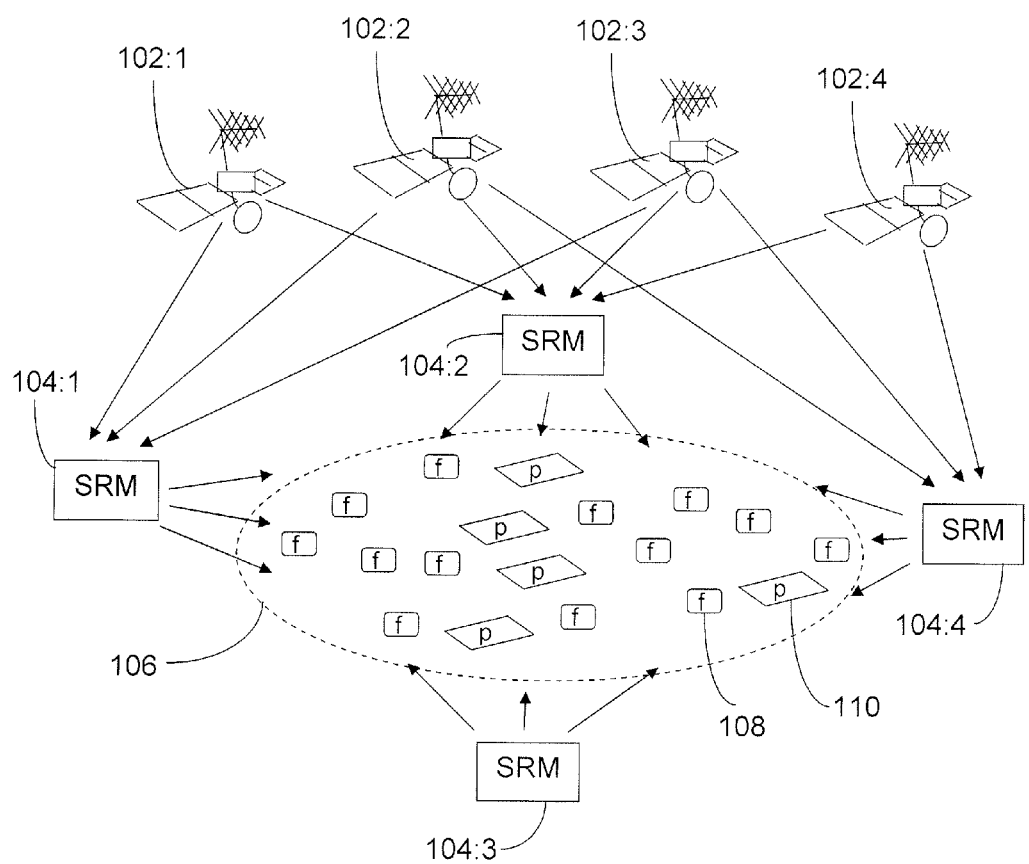
FIG. 1 is a schematic view illustrating a system comprising support nodes obtaining information from satellites and providing synchronization information to a set of base stations, according to an exemplifying embodiment.

FIG. 1 is a schematic view, illustrating a situation where several femto base stations 108, marked "f", and pico base stations 110, marked "p", in an area 106 are provided with synchronization information from a set of SRMs 104:1-4, which obtain time and frequency information from a number of satellites 102:1-4.

In the example in FIG. 1, an SRM receives time reference signal(s) from the satellites by use of a satellite receiver, e.g. a GPS receiver. The satellite receiver is also used to obtain the geographical position of the SRM. The SRM then transmits, e.g. broadcasts, time reference information using a free long wave frequency band to the base stations. The SRM may further provide information of the position of the SRM over the long wave frequency band to the base stations.

When an SRM is located at a relatively, in these circumstances, "large" distance from a base station, the propagation delay of the long wave signal may become significant in relation to the required time accuracy of the RAT in question. For example, a distance of 300 meters corresponds to a propagation delay of approximately 1 μs. For LTE, 1 μs is a significant part of the 1.5 μs deviation which is allowed for the LTE air interface. To compensate for such propagation delay, a propagation delay compensation factor could be calculated for the time signal when the position of the SRM and the position of the base station are known. The compensation factor could e.g. be calculated when the distance between the SRM, from which time information is received, and the base station exceeds a predefined length, which may depend on the RAT in question. Alternatively, the propagation delay compensation factor may be calculated, and used, irrespective of the distance between the SRM and base station, i.e. even when the propagation delay is insignificant in the circumstances.

In order to enable and/or facilitate for a base station to separate and identify signals from different SRMs, some sort of multiplexing could be applied to the signals from the different SRMs. For example, code division using orthogonal pseudo random (PN) sequences could be used to multiplex the signals. Each SRM could be assigned a PN-sequence when commissioning of the SRM is done. Alternatives to PN-sequence assignment during commissioning could be to use a measurement receiver to select a PN-sequence that is not used by other SRMs, or, a serial number, or some other identifier, of an SRM could be used when calculating the PN-sequence to use for said SRM. Alternatively, or in addition, other multiplexing techniques, such as e.g. time and/or frequency multiplexing could be used for separating the signals from different SRMs.

Figure 2:
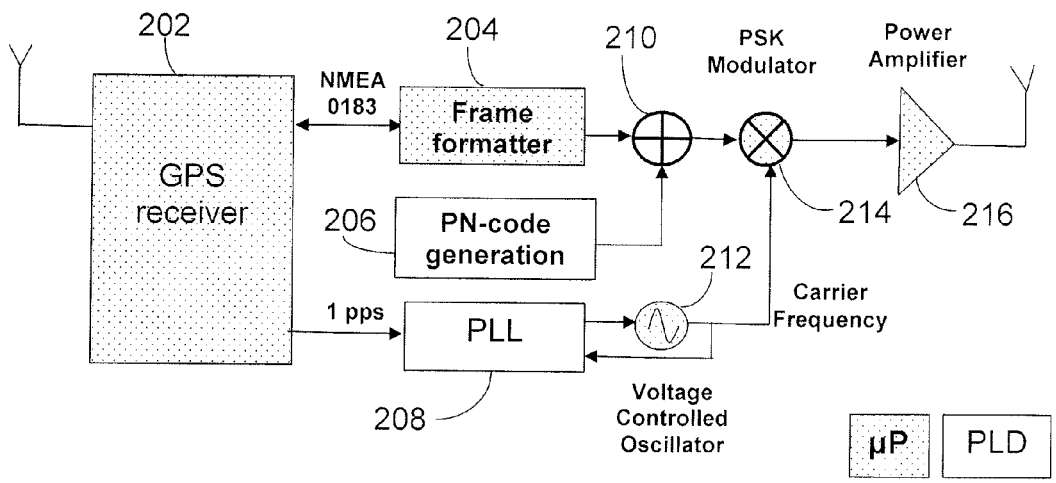
FIG. 2 is a block diagram illustrating an arrangement in a support module, according to an example embodiment.

Exemplifying Arrangement, SRM, FIG. 2

FIG. 2 is a block diagram illustrating components of an exemplifying SRM. A GPS receiver module 202 provides PPS, i.e. a Pulse Per Second signal and a standard serial interface, e.g. NMEA0183, where position and absolute time can be read. A frame formatter 204, here implemented using a micro controller, extracts timing and positioning information from the GPS receiver module 202 and converts it to a predefined frame format, such as e.g. the proposed frame format described further below. The output bits of the frame formatter are XOR'ed with a PN sequence, generated by a PN-code generation block 206. The XOR'ed output signal is then modulated in a Phase Shift Keying (PSK) modulator 214 with a carrier frequency generated by the Phase Locked Loop (PLL) block 208. Finally, the signal is amplified by a Power Amplifier (PA) 216. In order to generate a stable, accurate carrier frequency, the PLL is phase locked to the PPS signal provided by the GPS receiver module.

In this exemplifying arrangement, and the next exemplifying arrangement illustrated in FIG. 3 and described below, the different components have been illustrated as being implemented using either a processor, in this case a micro controller, or a Programmable Logical Device (PLD), such as an ASIC (Application-Specific Integrated Circuit) or an FPGA (Field-Programmable Gate Array). The components being implemented using a micro controller are illustrated as having a dotted background, and the components being implemented using a PLD are illustrated having a white background. Other implementations using different combinations of software and/or hardware are also possible.

Instead of using a GPS receiver to get time and frequency reference it is possible to use a stable reference clock connected to the SRM. The position of the SRM unit must in this case be manually provided when commissioning the SRM unit, or be derived using some other reference source.

Figure 3:
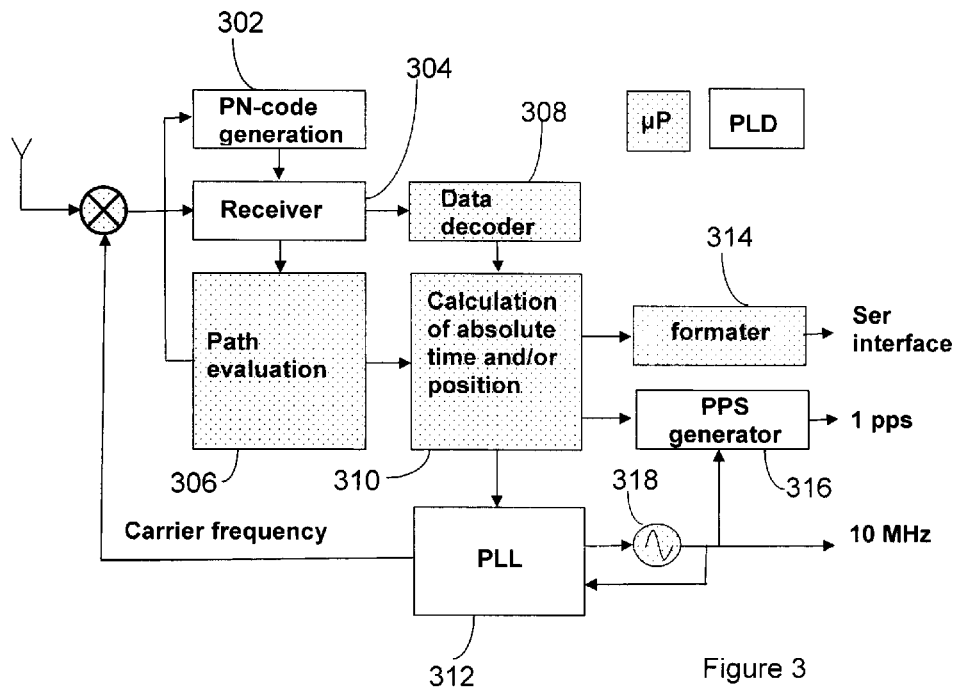
FIG. 3 is a block diagram illustrating an arrangement in a base station, according to an example embodiment.

Exemplifying Arrangement, Base Station, FIG. 3

FIG. 3 is a schematic view of exemplifying additional receiver parts or functions required for a base station, such as e.g. a so-called "femto" base station, to receive long wave signals from surrounding SRMs. The signal from an SRM may be converted to base band using standard modulator feed with a carrier frequency signal from the PLL 312.

By use of a PN-sequence generation block 302, a receiver block 304 and a path evaluation block 306, the received signals can be evaluated in order to detect signals from e.g. 3 or 4 SRMs. Reception from 4 SRMs is required in order to derive the correct position in longitude, latitude and altitude. In the receiver block 304 the received signal is correlated with the predefined PN sequences. When the correlation result is above a threshold, a signal from an SRM with a matching PN sequence is found. Several correlation results above the threshold may be found for a given PN sequence. These results represent the direct path, and a number of reflections. Since long wave transmission is used, the first received correlation result is considered to be the direct path.

When signals from e.g. four SRMs have been found, a data decoder block 308 can be used to decode data according to the predefined frame format. With access to the decoded data and the result from the path evaluation block, the absolute time and position of the base station may be calculated. The result is formatted by a formatter block 314, and provided to the regular base station functionality using a serial interface, thus synchronizing the base station. In this example, a PPS and a 10 MHz clock signal are also provided.

Figure 4:
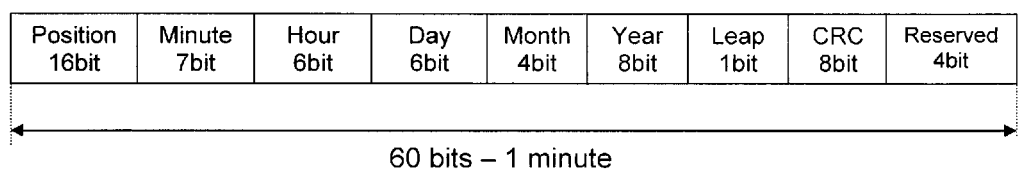
FIG. 4 is a schematic view illustrating an exemplifying frame format, which could be used when conveying information from a support node to a base station, according to an example embodiment.

FIG. 4 shows an example of a frame format, which could be used for conveying information from an SRM to a base station in the long wave frequency band. The exemplifying frame is one minute long. Thus, for example, each minute the following data could be transmitted:

31 bits containing current date and time
1 leap second warning bit
8 bit Cyclic Redundancy Check (CRC) field
16 bit position field
4 reserved bits The basic frame sync can be achieved in the receiver by using a CRC-based framing method. The receiver will then continuously calculate CRC over incoming data, it will bit shift the incoming data until it finds a position where the correct CRC is decoded for a number of times. The receiver then has detected the frame sync.

Date, time, and leap second warning bit may be repeated every minute. However, in order to transmit the position, 40 frames will be needed when using 16 bits per frame for positioning information. The 40 frames form a hyper frame providing the position. The position data may be used as follows:

1. Longitude 24 bytes,
2. Latitude 24 bytes,
3. Altitude 24 bytes,
4. Hyper Frame Framing 8 byte, where the Hyper Frame Framing is a predefined pattern that needs to be correctly decoded a number of times in order to achieve hyper frame sync.

Below, a more general procedure and arrangement in a support module, e.g. denoted SRM, and in a base station will be described with reference to FIGS. 5-8.

Figure 5:
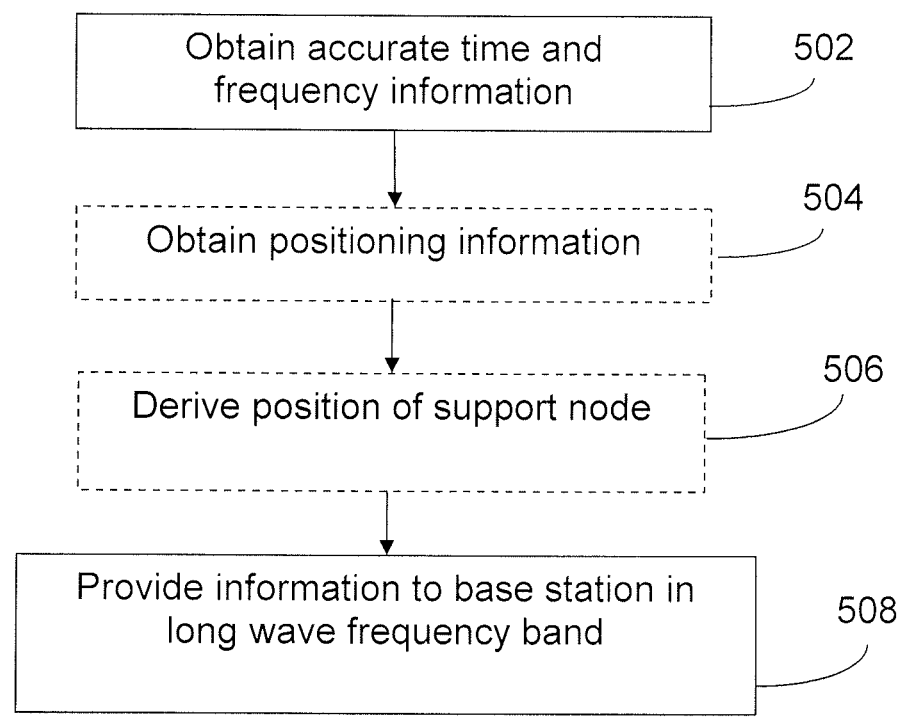
FIG. 5 is a flow chart illustrating a procedure in a support module for supporting synchronization of a base station, according to an example embodiment.

Exemplifying Procedure, FIG. 5

An embodiment of a method in a support module for supporting synchronization or calibration of a base station will now be described with reference to FIG. 5.

Initially, high-accuracy time and frequency information is received or retrieved from a reference source in an action 502. The reference source may be e.g. a positioning system, such as a satellite based system like GPS or another Global Navigation Satellite System (GNSS), or, a communication network fulfilling the requirements of e.g. LTE air interface communication. Alternatively, the reference source could be an atomic clock.

The support module may also obtain positioning information from said reference source or possibly from another reference source in an action 504. For example, when the reference source which provides time and frequency information does not provide positioning information, the positioning information could be obtained from another reference source. Further, the geographical position of the support module could be determined based on the positioning information obtained from the reference source. The geographical position of the support module could be determined e.g. triangulation using signals from a number of satellites.

The obtained time and frequency information is then provided, e.g. broadcasted, to the base station by use of long wave signaling in an action 508. By providing said information in the long wave frequency band, a base station receiving the information is enabled to synchronize, i.e. obtain a time and frequency signal of an accuracy fulfilling the predefined requirements for communicating over an air interface of a communication system, as previously described.

The geographical position of the support module may also be provided in the long wave frequency band along with the time and frequency information. Providing the geographical position of the support module enables a base station receiving the information to determine the geographical position of the base station, and to e.g. calculate a propagation delay compensation factor to compensate for the propagation delay of the long wave signaling from a support module to the base station.

Figure 6:
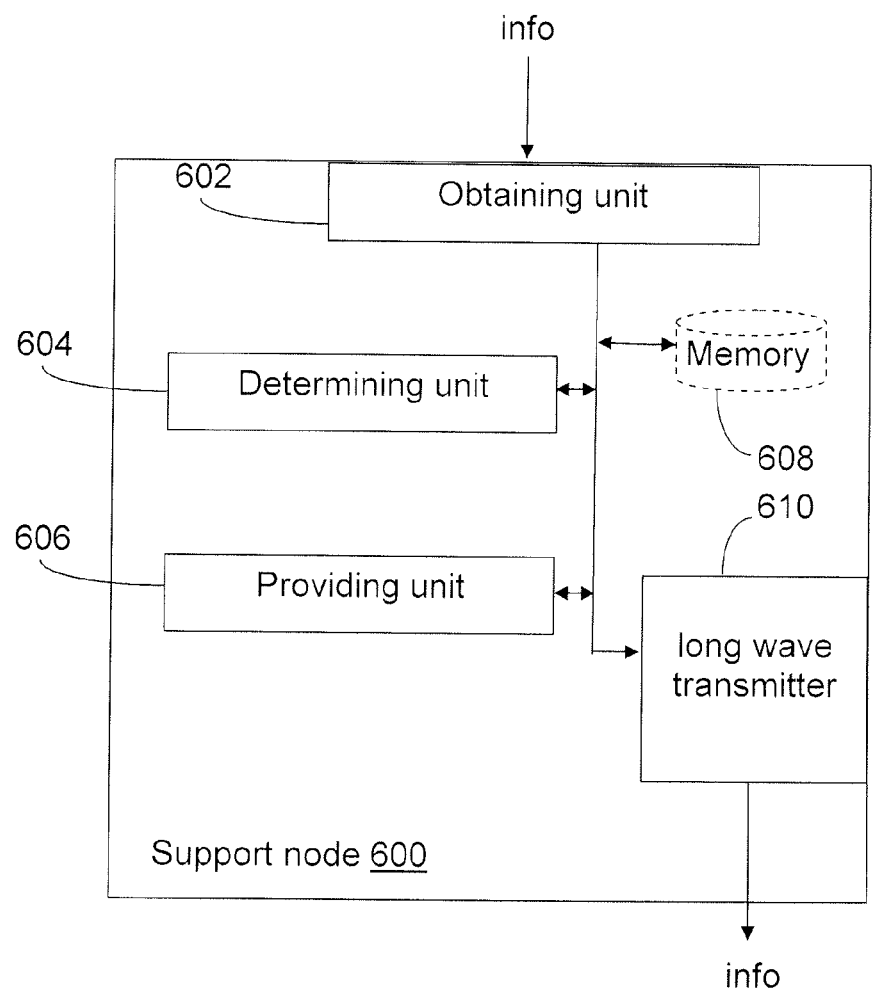
FIG. 6 is a block diagram illustrating an arrangement in a support module adapted for supporting synchronization of a base station, according to an example embodiment.

Exemplifying Arrangement, FIG. 6

Below, an example arrangement 600, adapted to enable the performance of the above described procedure of supporting synchronization of a base station will be described with reference to FIG. 6. The support module may be a separate module located at a separate position having favourable radio conditions, or, it could be co-located with or integrated with a communication network module in a location having favourable radio conditions, such as e.g. a macro base station. The arrangement could be activated and deactivated remotely, such that e.g. many network nodes could be provided with such an arrangement, but only an adequate subset of the arrangements are selected to be active.

The support module 600 comprises an obtaining unit 602, which is adapted to receive or retrieve high-accuracy time and frequency information, and possibly positioning information, from a reference source. The obtaining unit 602 could comprise e.g. a receiver and a demultiplexing module. The reference source could, as previously described, be e.g. a GNSS, such as the GPS.

The support module 600 may further comprise a determining unit 604, which may be adapted to determine the geographical position of the support module, based on positioning information obtained from the reference source.

The support module 600 further comprises a providing unit 606, adapted to provide the high-accuracy time and frequency information, and possibly information on the geographical position of the support module, over the so-called long wave frequency band. In order to transmit in the long wave frequency band, the support module 600 further comprises a transmitter 610, capable of transmitting at "long" wavelengths, e.g. below 500 kHz, which easily penetrates and propagates through e.g. buildings and similar. The support module may further comprise various functional units for e.g. storage of intermediate information. Such functional units are illustrated in form of a memory 608, having a dashed outline.

Figure 7:
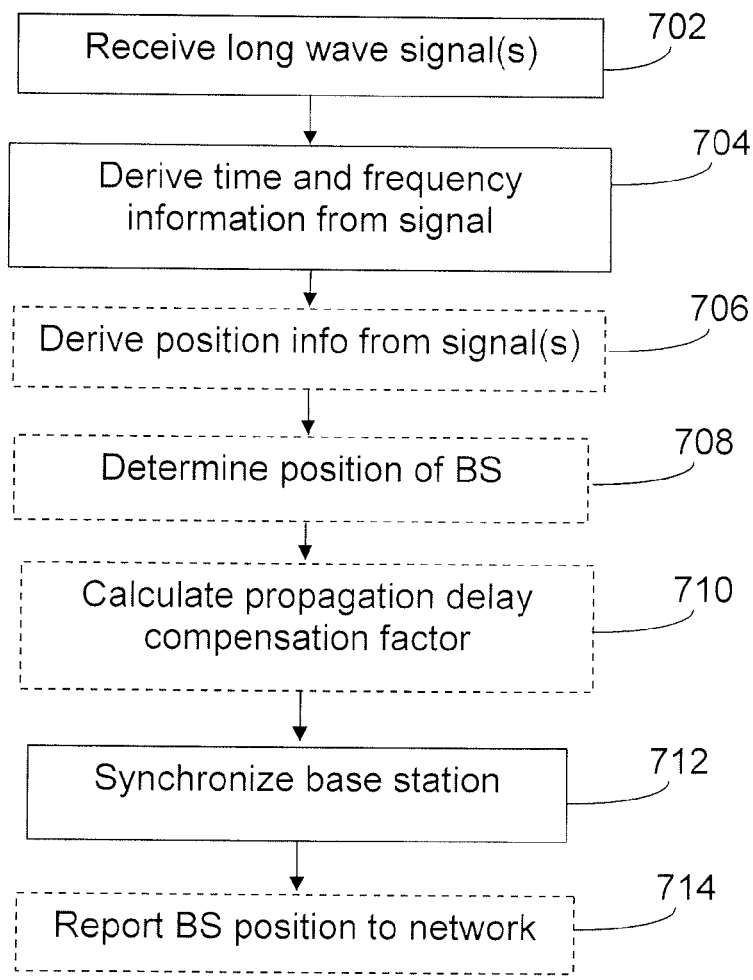
FIG. 7 is a flow chart illustrating a procedure for supporting synchronization of a base station, according to an example embodiment.

Exemplifying Procedure, FIG. 7

An embodiment of a method associated with a base station, for supporting synchronization or calibration of said base station will now be described with reference to FIG. 7. The base station is assumed to be a part of a cellular communication network, and may be located in a place having unfavorable radio conditions. Optional actions are illustrated having a dashed outline.

Initially, a long wave signal is received from at least one support module in an action 702. Then, high-accuracy time and frequency information is derived from the received signal(s) in an action 704. Further, positioning information may be derived from the received signal(s) in an action 706. The positioning information could e.g. be the respective geographical position of the support modules from which a respective signal is received. Thus, the geographical position of the base station may be determined based on the derived positioning information in an action 708.

The number of geographical references, i.e. geographical positions of support modules, needed in order to determine the geographical position of the base station depends on the required level of accuracy needed for the determined position. For example, in order to determine e.g. in which country the base station is located, in most cases only one geographical reference would be needed. However, to attain a geographical position in two dimensions, i.e. longitude, latitude, at least three support module position references are needed. In some geographical and/or architectural conditions, four geographical references may be needed to correctly determine the altitude of the base station.

The determined geographical position of the base station could be used in an action 710 for calculating a propagation delay compensation factor to be applied on the time information received from a first support module. The calculation of the propagation delay compensation factor should be based on the geographical position of said first support module and the geographical position of the base station, i.e. the distance the long wave signal from the first support module propagates or traverses before reaching the base station. The propagation delay compensation factor could be applied to the time information received from the first support module, if found necessary, and thus compensate said information for errors introduced by the propagation delay. When the distance between a support module and the base station is relatively small, no propagation delay compensation factor will be needed. It could be determined e.g. based on the distance from the base station to the closest support module whether a propagation delay compensation factor should be calculated or not.

The determined geographical position of the base station could further be reported to a control node in the cellular communication network in an action 714, thus providing information enabling e.g. an operator to perform improved cell planning and/or to prevent misuse of mobile base stations. For example, an operator could prevent re-parenting, such as e.g. when a person brings her/his femto base station with her/him during a visit to a foreign country, and plugs it in to a local IP net, in order to make free calls.

The base station is synchronized in an action 712, based on the derived high-accuracy time and frequency information. The time information may possibly be corrected before synchronization by use of a calculated propagation delay compensation factor.

The synchronization may involve using the derived time information for synchronizing an internal clock of the base station, and may further involve generating or deriving a high-accuracy frequency signal based on the derived high-accuracy time information, for use as reference frequency for synchronizing base station frequency generation. Further or alternatively, the synchronization may involve deriving a carrier frequency of the long wave signaling, and synchronizing base station frequency generation based on said derived carrier frequency.

The frequency and time information may further be converted or formatted to any format suitable for synchronizing the base station.

Figure 8:
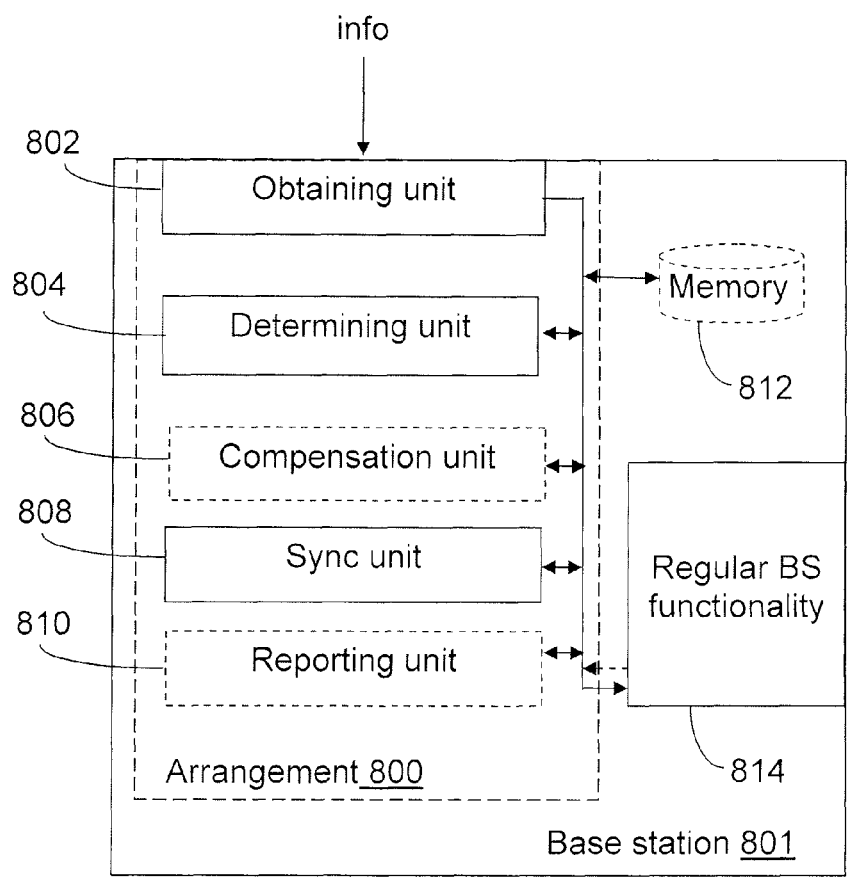
FIG. 8 is a block diagram illustrating an arrangement connectable to a base station adapted for supporting synchronization of the base station, according to an example embodiment.

Exemplifying Arrangement, FIG. 8

Below, an example arrangement 800, adapted to enable the performance of the above, in conjunction with FIG. 7, described procedure of supporting synchronization of a base station will be described with reference to FIG. 8. The arrangement 800 is connectable to a base station (801) in a cellular communication network, and could be integrated with the base station or be arranged as a separate, e.g. "add-on" unit in connection with the base station.

The arrangement 800 comprises an obtaining unit 802, which is adapted to receive long wave signals from at least one support module. The arrangement 800 further comprises a determining unit (804), adapted to derive high-accuracy time and frequency information from one or more received long wave signals. Further, the arrangement 800 comprises a synchronization unit 808, which is adapted to synchronize the base station, based on the derived information.

The arrangement 800 may further be adapted to derive information on the geographical position of a support module from a signal received from said support module; and may further be adapted to derive the geographical position of the base station based on the derived geographical position of at least one support module.

The arrangement 800 may further comprise a compensation unit, adapted to calculate a propagation delay compensation factor for the time information received from a first support module, based on the geographical position of said support module and the geographical position of the base station.

Further, the arrangement 800 may comprise a reporting unit 810, adapted to report the geographical position of the base station to a network control node, e.g. on a higher hierarchical level than the base station.

While the procedure as suggested above has been described with reference to specific embodiments provided as examples, the description is generally only intended to illustrate the inventive concept and should not be taken as limiting the scope of the suggested methods and arrangements, which are defined by the appended claims. While described in general terms, the methods and arrangements may be applicable e.g. for different types of communication systems, using commonly available communication technologies, such as e.g. GSM/EDGE, WCDMA or LTE.

It is also to be understood that the choice of interacting units or modules, as well as the naming of the units are only for exemplifying purpose, and entities suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

ABBREVIATIONS

CSD Cellular Synchronization Distribution
GNSS Global Navigation Satellite System
NTP Network Time Protocol
SRM Synchronization Repeater Module

The invention claimed is:

1. A method in a support module for supporting synchronization of a base station in a cellular communication network, the method comprising:
   obtaining high-accuracy time information from a reference source, wherein the reference source is a satellite based positioning system; and
   providing said time information to the base station by use of long wave signaling, thus enabling the base station to synchronize.

2. The method of claim 1, wherein the positioning system is the Global Positioning System (GPS).

3. The method of claim 1, further comprising:
   obtaining information related to positioning from the reference source;
   deriving the geographical position of the support module, based on said information related to positioning obtained from the reference source; and
   providing said geographical position of the support module to the base station by use of long wave signaling.

4. An arrangement in a support module for supporting synchronization of a base station in a cellular communication network, the arrangement comprising:
   an obtaining circuit adapted to obtain high-accuracy time information from a reference source, wherein the reference source is a satellite based positioning system; and
   a providing circuit adapted to provide said time information to the base station by use of long wave signaling.

5. The arrangement of claim 4, wherein the obtaining circuit is further adapted to obtain information related to positioning from the reference source; the arrangement further comprising a determining circuit adapted to derive the geographical position of the support module, based on said information related to positioning obtained from the reference source, and wherein the providing circuit is further adapted to provide said geographical position of the support module to the base station by use of long wave signaling.

6. A method for supporting synchronization of a base station, the method comprising:
   receiving a long wave signal from at least one support module, the long wave signal comprising time information from a satellite based positioning system;
   deriving high-accuracy time and frequency information from the received signal or signals; and
   synchronizing the base station based on the derived information.

7. The method of claim 6, wherein the synchronization includes at least one of:
   using the derived time information for synchronizing an internal clock of the base station;
   generating a high-accuracy frequency signal based on the derived high-accuracy time information, as reference frequency for synchronizing base station frequency generation; and
   deriving a carrier frequency of the long wave signaling, and synchronizing base station frequency generation, based on said derived carrier frequency.

8. The method of claim 6, further comprising:
   deriving the geographical position of the at least one support module from the received signal or signals; and
   deriving the geographical position of the base station based on said geographical position of the at least one support module.

9. The method of claim 8, wherein the geographical position of the base station is derived based on the respective geographical position of at least three support modules.

10. The method of claim 8, wherein said geographical position of the base station is reported to a network control module.

11. The method of claim 8, further comprising calculating a propagation delay compensation factor for the time information received from a first support module, based on the geographical position of said support module and the geographical position of the base station.

12. An arrangement connectable to a base station in a cellular communication network, for supporting synchronization of said base station, the arrangement comprising:
   an obtaining circuit adapted to receive long wave signals from at least one support module, the long wave signal comprising time information from a satellite based positioning system;
   a determining circuit adapted to derive high-accuracy time and frequency information from one or more received long wave signals, and
   a synchronization circuit adapted to synchronize the base station, based on the derived information.

13. The arrangement of claim 12, wherein the determining circuit is further adapted to derive information on the geographical position of a support module from a signal received from said support module and to derive the geographical position of the base station based on the derived geographical position of at least one support module.

14. The arrangement of claim 13, further comprising a reporting circuit adapted to report the geographical position of the base station to a network control node.

15. The arrangement of claim 13, further comprising a compensation circuit adapted to calculate a propagation delay compensation factor for the time information received from a first support module, based on the geographical position of said support module and the geographical position of the base station.

16. A base station comprising an arrangement for supporting synchronization of said base station, the arrangement comprising:
- an obtaining circuit adapted to receive long wave signals from at least one support module, the long wave signal comprising time information from a satellite based positioning system;
- a determining circuit adapted to derive high-accuracy time and frequency information from one or more received long wave signals, and
- a synchronization circuit adapted to synchronize the base station, based on the derived information.

* * * * *